United States Patent [19]

Inaba

[11] Patent Number: 4,693,676
[45] Date of Patent: Sep. 15, 1987

[54] SCREW-ROTATING/INJECTION MECHANISM OF INJECTION MOLDING MACHINE

[75] Inventor: Yoshiharu Inaba, Kawasaki, Japan

[73] Assignee: Fanuc Ltd, Minamitsuru, Japan

[21] Appl. No.: 841,523

[22] PCT Filed: Jul. 5, 1985

[86] PCT No.: PCT/JP85/00382
§ 371 Date: Mar. 6, 1986
§ 102(e) Date: Mar. 6, 1986

[87] PCT Pub. No.: WO86/00562
PCT Pub. Date: Jan. 30, 1986

[30] Foreign Application Priority Data

Jul. 7, 1984 [JP] Japan .................. 59-139753

[51] Int. Cl.4 ............................. B29C 45/77
[52] U.S. Cl. ........................ 425/145; 264/407;
366/78; 425/149; 425/159; 425/376 B;
425/582; 425/583; 425/587
[58] Field of Search ............ 425/145, 159, 542, 567,
425/582, 583, 585, 587, 204, 207, 208, 376 B,
155, 171, 149, 376 R, 558, 574, 579; 264/40.5,
40.7; 366/78

[56] References Cited

U.S. PATENT DOCUMENTS 3,262,154 7/1966 Valyi ................................ 425/207
3,859,400 1/1975 Ma ................................... 264/40.5
4,540,359 9/1985 Yamazaki ......................... 425/589

FOREIGN PATENT DOCUMENTS 36-8935 6/1961 Japan .
39-10424 4/1964 Japan .

Primary Examiner—Jay H. Woo
Assistant Examiner—Timothy W. Heitbrink
Attorney, Agent, or Firm—Staas & Halsey

[57] ABSTRACT

A screw-rotating/injection mechanism of an injection molding machine has a screw shaft (1) having a rear portion thereof connected to a drive shaft (1') which is rotatably fixed to a pressure plate (4). A nut (6) which is spline-coupled to a spline shaft (5) constituting a rear portion of the drive shaft (1') is driven by a screw rotating motor (M1) through a first transmission unit (9, 10, 13, 15) to rotate the screw shaft (1). A ball screw (8, 8') threadedly engaged with a ball nut (7, 7'), fixed to the pressure plate (4), is driven by an injection servo motor (M2) through a second transmission unit (11, 11', 14, 16) to move the screw shaft (1) forward, thereby performing injection.

4 Claims, 1 Drawing Figure

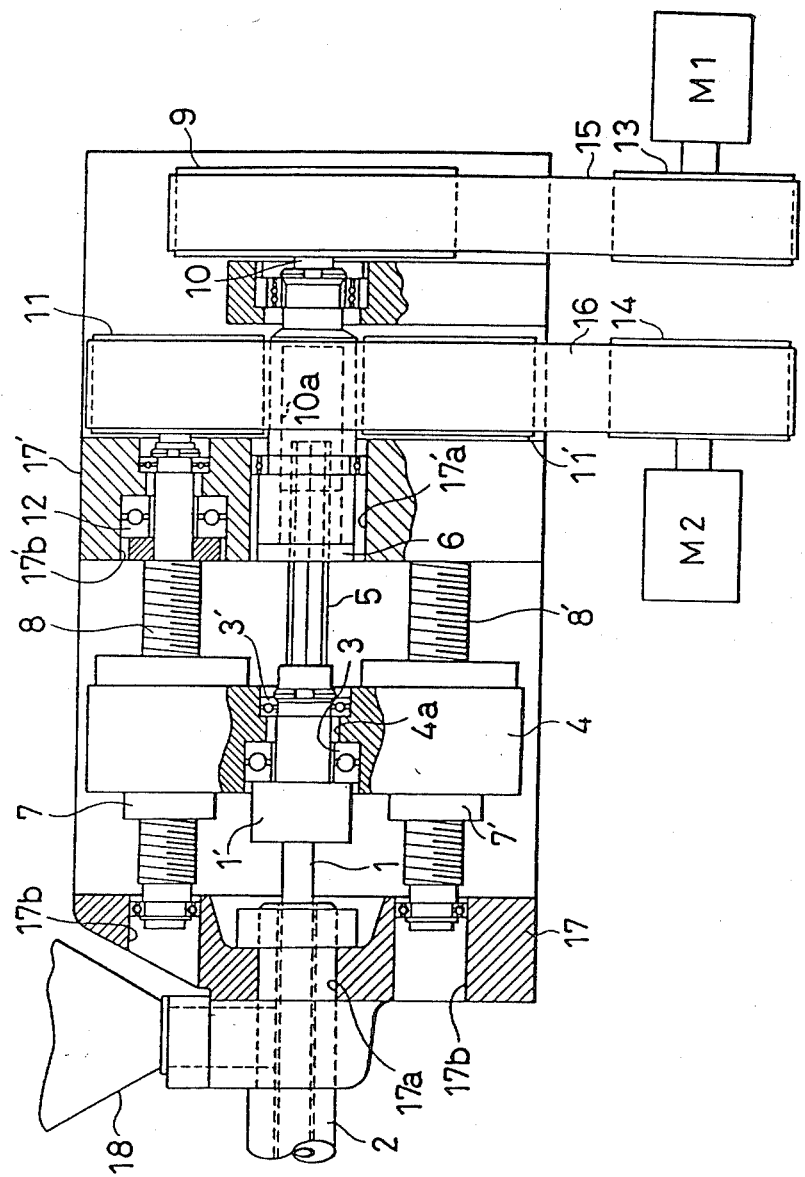

SCREW-ROTATING/INJECTION MECHANISM OF INJECTION MOLDING MACHINE

TECHNICAL FIELD

The present invention relates to a screw-rotating/injection mechanism of an injection molding machine which rotates a screw and performs injection through forward movement of the screw. Background Art In a conventional injection molding machine, an electric motor or a hydraulic motor is used as a drive unit for rotating a screw, and a hydraulic unit is usually used as a drive unit for moving the screw forward to inject a molding material into a mold. Another conventional injection molding machine has also been developed which uses a motor as the injection drive unit.

DISCLOSURE OF INVENTION

It is an object of the present invention to provide a screw-rotating/injection mechanism of an injection molding machine using a motor as a drive unit for rotating a screw and as an injection drive unit for forward movement of the screw, wherein injection control can be easily performed.

In order to achieve the above object, the present invention comprises a drive shaft fixed to a rear portion of a screw shaft and rotatably fixed to a pressure plate, a nut spline-coupled to a spline shaft which is formed on the drive shaft at a rear side of the drive shaft with respect to the pressure plate, a first transmission unit coupled to the nut, a screw rotating motor for driving the nut through the first transmission unit, a plurality of ball nuts fixed to the pressure plate, a plurality of ball screws threadedly engaged with corresponding ones of the plurality of ball nuts, a second transmission unit coupled to the plurality of ball screws, and an injection servo motor for driving the plurality of ball screws simultaneously through the second transmission unit.

In this manner, according to the present invention, when the screw is rotated the screw rotating motor is driven, and when the screw is moved forward, the injection motor is driven to rotate the plurality of ball screws simultaneously, the rotation of which moves the pressure plate forward so that the screw fixed to the pressure plate is drivingly separated from the screw rotating mechanism by the spline shaft, thereby moving only the screw forward. To perform injection, the screw rotating mechanism is first drivingly separated and a servo motor M2 for injection then drives only a second transmission mechanism for moving the screw forward and the screw. Since no unnecessary load mechanism is included, injection can be performed with a good response characteristic, and the pressure plate can be moved smoothly forward, thereby performing excellent injection control.

BRIEF DESCRIPTION OF DRAWING

The accompanying drawing is a partially sectional side view of an embodiment of the present invention.

BEST MODE OF CARRYING OUT THE INVENTION

The accompanying drawing shows an embodiment of the present invention. In the drawing, a screw shaft 1 has a screw at its distal end. A cylinder 2 storing the screw extends though a central hole 17a of a front base 17. A drive shaft 1' is coupled to be stationary to the screw shaft 1 at the rear portion of the screw shaft 1, but is rotatably fixed to a pressure plate 4 through thrust bearings 3 and 3', disposed at large-diameter portions at two ends of a central stepped hole 4a in the pressure plate 4. A rear portion of the drive shaft 1', away from the pressure plate 4, constitutes a spline shaft 4 having a spline engaging portion on an outer surface thereof. The spline shaft 5 extends through a central hole 17'a in a rear base 17' and through a spline coupling nut 6 disposed in the central hole 17'a, and engages with the spline coupling nut 6 through a spline. The nut 6 is fixedly fitted in an inner hole 10a in a shaft 10 of a timing belt gear 9. A timing belt 15 extends between the timing belt gear 9 and a timing belt gear 13 fixed to the motor shaft of a servo motor M1. Ball nuts 7 and 7' are fixed to the pressure plate 4. Ball screws 8 and 8' threadedly engaged with the ball nuts 7 and 7' extend through insertion holes (not shown) in a peripheral portion of the pressure plate 4, and are parallel to the screw shaft 1 between the front base 17 and the opposing rear base 17'. The two ball screws 8 and 8' are symmetrically arranged to each other with respect to the screw shaft 1. The plurality of ball screws 8 and 8' are thus arranged around a circumference of the screw shaft 1 in this manner, at the same angular intervals, and drive the pressure plate 4 to allow its smooth forward movement. Two ends of each of the ball screws 8 and 8' are pivotally supported by bearings arranged in through holes 17b and 17'b in the bases 17 and 17'. Timing belt gears 11 and 11' are fixed to the rear ends, respectively, of the ball screws 8 and 8'. A timing belt 16 extends between the timing belt gears 11 and 11' and a timing belt gear 14 fixed to the motor shaft of a servo motor M2. Note that a thrust bearing 12 is provided and a hopper 18 supplies the molding material into the cylinder 2.

When the screw is rotated by the above arrangement, the servo motor M1 is driven to rotate the spline shaft 5 and the screw shaft 1 through the timing belt gear 13, the timing belt 15, the timing belt gear 9, the shaft 10 and the spline coupling nut 6. In this case, the drive shaft 1', to which the screw shaft 1 is fixed, and the pressure plate 4 are fixed by the bearings 3 and 3' to be rotatable relative to each other and axially immovable relative to each other. Thus, when the molding material is melted by rotation of the screw and the screw shaft 1 is moved backward (to the right in the drawing) by the increased pressure, the pressure plate 4 is moved backward together with the screw shaft 1, thereby rotating the ball screws 8 and 8' threadedly engaging with the ball nuts 7 and 7', integral with the plate 4. As a result, the timing belt gears 11 and 11', the timing belt 16 and the timing belt gear 14 are rotated, thereby rotating the motor shaft of the servo motor M2. At the same time, the drive current of the servo motor M2 is controlled by a servo circuit (not shown), thereby controlling the back pressure to the screw by the servo motor M2.

When injection is performed, driving of the servo motor M1 is stopped at a metering point to stop rotation of the screw shaft 1, and the servo motor M2 is then driven to rotate the ball screws 8 and 8' simultaneously in the same direction through the timing belt gear 14, the timing belt 16 and the timing belt gears 11 and 11', so that the pressure plate 4 is moved forward (to the left in the drawing) by the ball nuts 7 and 7' engaged with the ball screws 8 and 8'. Thus, the screw shaft 1 slides between the spline shaft 5 and the spline coupling nut 6 and is separated from the screw rotating mechanism consisting of the spline shaft 5 and the servo motor M1.

As a result, only the screw shaft 1 is urged forward by the pressure plate 4.

What is claimed is:

1. A screw-rotating/injection mechanism for use in an injection molding machine, comprising:
    a screw shaft having a front end and a rear end, said front end having a screw formed thereon;
    a drive shaft fixed to the rear end of said screw shaft and disposed in axial alignment with said screw shaft;
    a pressure plate for rotatably supporting said drive shaft, said pressure plate having a central portion and a peripheral portion thereof, said drive shaft extending through the central portion of said pressure plate and being disposed rotatably but axially immovable relative to said presure plate, said drive shaft being formed with a spline shaft at a rear side of said drive shaft with respect to an axial position wherein said drive shaft is supported by said pressure plate;
    a nut spline-coupled to said spline shaft;
    a screw rotating motor;
    a first transmission unit coupling said nut to said screw rotating motor;
    a plurality of ball nuts disposed in the peripheral portion of said pressure plate in a manner unrotatable relative to said pressure plate;
    a plurality of ball screws extending in parallel with said screw shaft and disposed circumferentially of said screw shaft at angular intervals, each of said ball screws having a rear end portion and arranged rotatably and threadably coupled to a corresponding one of said ball nuts, said pressure plate being supported by said ball screws in a manner axially movable relative to said ball screws;
    an injection servo motor; and
    a second transmission unit coupling said injection servo motor to the rear end portion of each of said ball nuts, said ball nuts being driven simultaneously by said injection servo motor through said second transmission unit.

2. A mechanism according to claim 1, further comprising:
    front and rear bases being dispoed at opposite sides of said pressure plate, respectively, and disposed opposite to each other, each of said bases being formed with a central hole and through holes, said through holes being formed at a peripheral portion of each base and corresponding in number to said ball screws; and bearings being disposed in the through holes formed in the front and rear bases; and
    wherein said screw shaft and said drive shaft extend through the central holes formed in said front and rear bases, respectively, each of said ball screws being rotatably supported at its opposite ends by corresonding ones of said bearings.

3. A mechanism according to claim 2, wherein said nut is received in the central hole formed in said rear base; said first transmission unit including a first timing gear coupled to said nut for rotation in unison therewith and having a shaft which is disposed in alignment with said spline shaft, a second timing gear coupled to said screw rotating motor, and a first timing belt coupling said first timing gear to said second timing gear; said second transmission unit including a group of timing gears each coupled to the rear end porton of a corresponding one of said ball screws, a third timing gear coupled to said injection servo motor, and a second timing belt coupling said third timing gear to said group of timing gears; and the shaft of said timing gear extending up to an axial position remote from said rear base with respect to said group of timing gears without interference between said shaft and said group of timing gears.

4. A mechanism according to claim 1, wherein said ball screws are arranged at equal angular intervals circumferentially of said screw shaft.

* * * * *

UNITED STATES PATENT AND TRADEMARK OFFICE
CERTIFICATE OF CORRECTION

PATENT NO. : 4,693,676
DATED : SEPTEMBER 15, 1987
INVENTOR(S) : YOSHIHARU INABA

It is certified that error appears in the above-identified patent and that said Letters Patent is hereby corrected as shown below:

```
Col. 1, line 9, delete "Background Art";
        after line 9, insert the following heading:
                --Background Art--.
Col. 2, line 5, "shaft 4" should be --shaft 5--.
Col. 4, line 5, "dispoed" should be --disposed--.
```

Signed and Sealed this

Ninth Day of February, 1988

*Attest:*

DONALD J. QUIGG

*Attesting Officer*  *Commissioner of Patents and Trademarks*